United States Patent
Nagayo et al.

(10) Patent No.: US 10,234,038 B2
(45) Date of Patent: Mar. 19, 2019

(54) VALVE

(71) Applicant: MITSUBISHI HEAVY INDUSTRIES ENGINE & TURBOCHARGER, LTD., Kanagawa (JP)

(72) Inventors: Yukihide Nagayo, Tokyo (JP); Hiroyuki Hosoya, Tokyo (JP); Masaki Tojo, Tokyo (JP); Yusuke Furuta, Tokyo (JP)

(73) Assignee: Mitsubishi Heavy Industries Engine & Turbocharger, Ltd., Kanagawa (JP)

( * ) Notice: Subject to any disclaimer, the term of this patent is extended or adjusted under 35 U.S.C. 154(b) by 149 days.

(21) Appl. No.: 14/378,890

(22) PCT Filed: Nov. 12, 2012

(86) PCT No.: PCT/JP2012/079211
§ 371 (c)(1),
(2) Date: Aug. 14, 2014

(87) PCT Pub. No.: WO2013/128720
PCT Pub. Date: Sep. 6, 2013

(65) Prior Publication Data
US 2015/0014564 A1    Jan. 15, 2015

(30) Foreign Application Priority Data

Feb. 28, 2012 (JP) ................................ 2012-041382

(51) Int. Cl.
*F02D 9/10* (2006.01)
*F16K 1/20* (2006.01)
(Continued)

(52) U.S. Cl.
CPC .............. *F16K 1/20* (2013.01); *F01D 17/105* (2013.01); *F02B 37/183* (2013.01); *F02B 39/00* (2013.01);
(Continued)

(58) Field of Classification Search
CPC ........ F02D 11/10; F02D 9/107; F02D 9/1065; F02D 9/104; F02D 9/10
(Continued)

(56) References Cited

U.S. PATENT DOCUMENTS 3,102,382 A * 9/1963 Bozzola ................ F01D 17/105
 123/198 R
4,900,054 A * 2/1990 Kessler .................. B60G 11/32
 280/124.1

(Continued)

FOREIGN PATENT DOCUMENTS

CN 101952568 A 1/2011
DE 198 53 391 A1 5/2000
(Continued)

OTHER PUBLICATIONS

Stewart Glegg, Exhaust Muffler Design Principles, Sep. 16, 2005, p. 1.*

(Continued)

*Primary Examiner* — Jacob Amick
*Assistant Examiner* — Charles Brauch
(74) *Attorney, Agent, or Firm* — Birch, Stewart, Kolasch & Birch, LLP

(57) ABSTRACT

A valve, which is provided in an exhaust passage of an internal combustion engine to release exhaust, includes a valve seat having an opening opened to the exhaust passage, a valve body having a conical surface or a spherical surface configured to close the opening by coming into contact with the valve seat, a movement unit configured to move the valve body in a direction of intersecting the opening, and an urging unit configured to urge the valve body in the direction of intersecting the opening, and the urging unit controls urging force by the movement unit in a direction of suppressing vibration of the valve body caused by vibration of (Continued)

exhaust pulse frequency determined by a speed of the internal combustion engine and a number of cylinders of the internal combustion engine.

10 Claims, 7 Drawing Sheets

(51) Int. Cl.
  *F02B 37/18*  (2006.01)
  *F02B 39/00*  (2006.01)
  *F01D 17/10*  (2006.01)
  *F02D 11/10*  (2006.01)
  *F02B 39/16*  (2006.01)

(52) U.S. Cl.
  CPC ............. *F02B 37/186* (2013.01); *F02B 39/16* (2013.01); *F02D 9/10* (2013.01); *F02D 9/104* (2013.01); *F02D 9/107* (2013.01); *F02D 9/1065* (2013.01); *F02D 11/10* (2013.01); *Y02T 10/144* (2013.01)

(58) Field of Classification Search
  USPC ........................................................ 123/337
  See application file for complete search history.

(56) References Cited

U.S. PATENT DOCUMENTS

| | | | | |
|---|---|---|---|---|
| 5,439,204 | A | * | 8/1995 | Yamazoe .............. F16F 13/264 267/140.14 |
| 6,006,875 | A | * | 12/1999 | van Namen ............ F16F 15/03 188/378 |
| 2005/0238506 | A1 | * | 10/2005 | Mescher ........... A61M 5/14276 417/413.1 |
| 2010/0011764 | A1 | * | 1/2010 | Andrews ............... F01D 17/085 60/602 |
| 2011/0126537 | A1 | | 6/2011 | Yoshimoto et al. |

FOREIGN PATENT DOCUMENTS

| | | |
|---|---|---|
| DE | 10 2007 018 618 A1 | 10/2007 |
| JP | 61-76132 U | 5/1986 |
| JP | 61-200424 U | 12/1986 |
| JP | 62-75026 A | 4/1987 |
| JP | 62-171624 U | 10/1987 |
| JP | 2-131032 U | 10/1990 |
| JP | 5-90057 U | 12/1993 |
| JP | 6-43227 U | 6/1994 |
| JP | 2009-236088 A | 10/2009 |
| JP | 2011-179401 A | 9/2011 |
| WO | WO 2009/119392 A1 | 10/2009 |
| WO | WO 2010/135104 A2 | 11/2010 |
| WO | WO 2011/108331 A1 | 9/2011 |

OTHER PUBLICATIONS

European Search Report dated Oct. 13, 2015 in counterpart EP Application No. 12870001.0.
Chinese Office Action dated Dec. 28, 2015 in counterpart Chinese Application No. 201280070603.8 with partial English translation.
International Search Report dated Feb. 5, 2013 for Application No. PCT/JP2012/079211 with English Translation.
Written Opinion dated Feb. 5, 2013 for Application No. PCT/JP2012/079211 with English Translation.

* cited by examiner

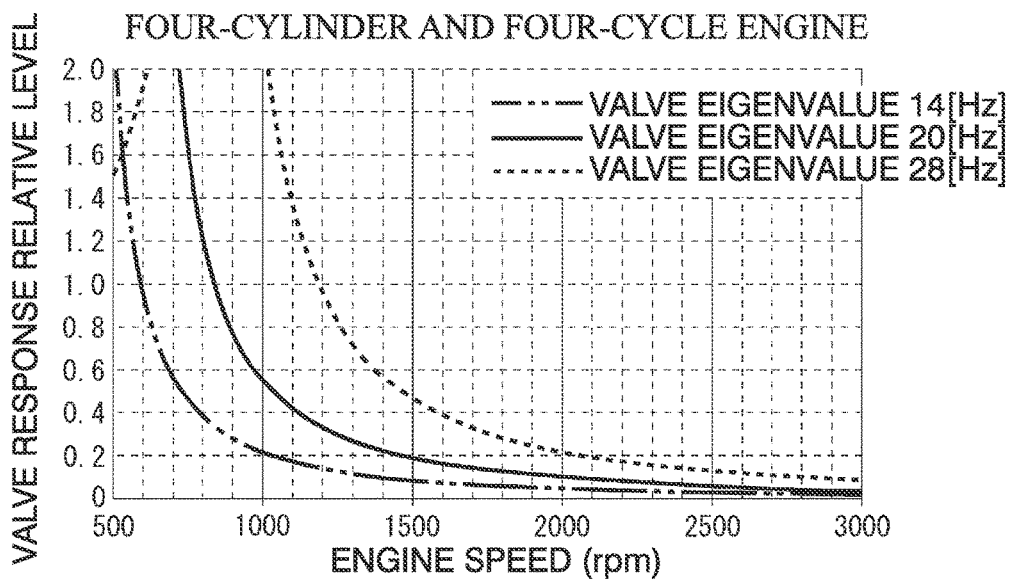
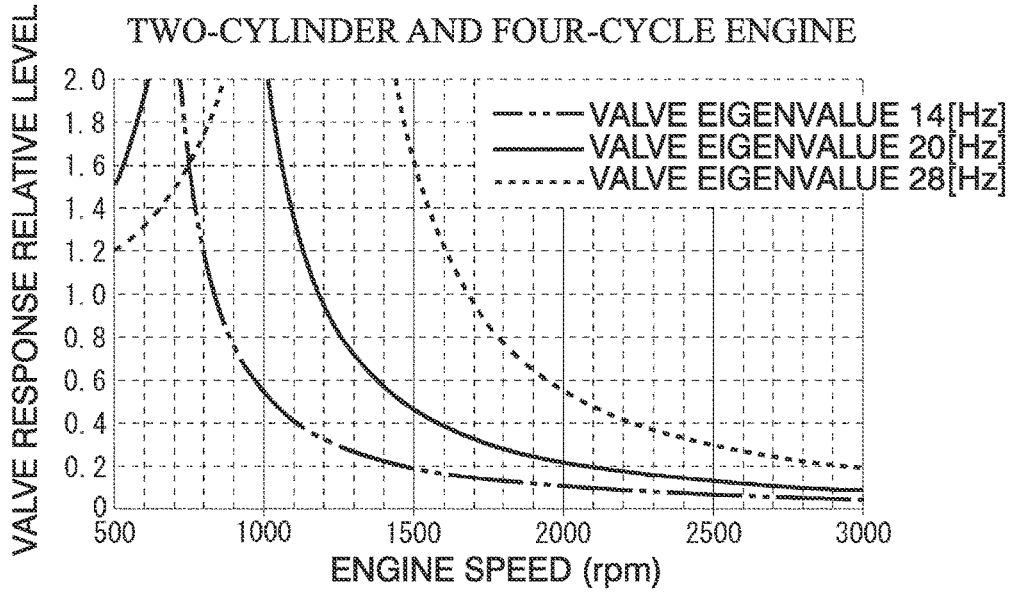

VALVE

TECHNICAL FIELD

The present invention relates to a valve provided in an exhaust passage of an internal combustion engine to change an exhaust path.

Priority is claimed on Japanese Patent Application No. 2012-041382, filed Feb. 28, 2012, the content of which is incorporated herein by reference.

BACKGROUND ART

Conventionally, as an engine such as a four-cycle engine for a vehicle, an engine including a turbocharger using an exhaust turbine driven by exhaust is known.

An exhaust system of the engine including the exhaust turbocharger is provided with a waste gate valve (a valve). The waste gate valve bypasses a portion of a passage that supplies engine exhaust to the exhaust turbine from the passage so as to open and close an exhaust bypass passage leading to an exhaust outlet passage. When a flow rate of exhaust is increased, that is, when an engine speed is high, the waste gate valve is opened. A portion of exhaust flowing toward the exhaust turbine is bypassed by opening of the waste gate valve. For this reason, excessive supply of exhaust to the exhaust turbine is restricted and an amount of supercharge (engine output) is suppressed within a proper range.

FIGS. 6A and 6B are views illustrating an exhaust turbine of an exhaust turbocharger equipped with a conventional valve. FIG. 6A is a front view of principal parts and FIG. 6B is a cross-sectional view of the principal parts.

In FIGS. 6A and 6B, reference numeral 1 designates a turbine casing of an exhaust turbine, reference numeral 2 designates a turbine provided within the turbine casing 1, and reference numeral 3 designates a waste gate valve. The waste gate valve 3 opens and closes an opening 5 provided upstream from an exhaust passage 4. The exhaust passage 4 communicates with an exhaust outlet passage 6 when the waste gate valve 3 is opened. Thus, exhaust supplied from an engine (not shown) via the exhaust passage 4 to the turbine 2 is introduced into the exhaust outlet passage 6 and bypasses the turbine 2.

The waste gate valve 3 includes a valve body 7, an arm 8, and a drive portion 9. The valve body 7 opens and closes the opening 5. When the valve is closed, the valve body 7 is pressed against a valve seat 5a so as to surround the opening 5. The arm 8 supports the valve body 7. The drive portion 9 rotates the arm 8 about a support point P to move the valve body 7 in a direction of intersecting the opening 5.

A specific configuration of the drive portion 9 will be omitted. The drive portion 9 uses an actuator or the like as a drive source which is not shown. When the speed of a basic engine is equal to or less than a predetermined speed (for example, 3000 rpm~round/min), the drive portion 9 closes the valve body 7 through the arm 8. When the speed of the basic engine is equal to or greater than a predetermined speed, the drive portion 9 opens the valve body 7 through the arm 8 (for example, see PLT 1).

CITATION LIST

Patent Literature

PLT 1: Japanese Unexamined Patent Application, First Publication No. 2009-236088

SUMMARY OF INVENTION

Technical Problem

In recent years, the downsizing of engines has been advancing. Specifically, engines having fewer cylinders have been adopted and an operation of stopping some cylinders during small output is performed. For this reason, vibration tends to increase during low rotation of the engine. The above-mentioned valve has a large contact area between the valve body 7 and the valve seat 5a since the valve body 7 is pressed against the opening 5 of the valve seat 5a while the valve body 7 has a substantially disc shape. Accordingly, in connection with a tendency for the vibration increase, there is a problem in that the above-mentioned valve easily resonates with respect to an exhaust pulse determined by the speed and number of cylinders of the basic engine and other vibration.

Particularly, when the valve is closed and the speed of the basic engine is low, the vibration of the valve body 7 is easily generated. The vibration of the valve body 7 causes abrasion, damage, and noise due to contact with the valve seat 5a when the valve is closed. This causes a problem in that durability of the valve body 7 is deteriorated.

An object of the present invention is to provide a valve capable of improving durability of a valve body.

Solution to Problem

In accordance with an aspect of the present invention, a valve, which is provided in an exhaust passage of an internal combustion engine to release exhaust, includes a valve seat having an opening opened to the exhaust passage, a valve body having a conical surface or a spherical surface configured to close the opening by coming into contact with the valve seat, a movement unit configured to move the valve body in a direction of intersecting the opening, and an urging unit configured to urge the valve body in the direction of intersecting the opening. The urging unit controls urging force by the movement unit in a direction of suppressing vibration of the valve body caused by vibration of exhaust pulse frequency determined by a speed of the internal combustion engine and a number of cylinders of the internal combustion engine.

According to the above-described valve, the valve seat has an opening opened to the exhaust passage, and the valve body having a conical surface or a spherical surface comes into contact with the valve seat to close the opening. The movement unit moves the valve body in a direction of intersecting the opening. The urging unit urges the valve body in the direction of intersecting the opening. The urging force is set to be controlled in a direction of suppressing vibration of the valve body caused by vibration of exhaust pulse frequency determined by a speed and the number of cylinders of the internal combustion engine. Therefore, the valve body can be suppressed from resonating by vibration of exhaust pulse frequency during rotation of the internal combustion engine. Thus, durability of the valve body can be improved.

In the above-described valve, the movement unit may control the urging force of the urging unit in accordance with exhaust pulse frequency caused by a change in speed of the internal combustion engine.

According to the above-described valve, the urging force of the urging unit is changed in accordance with exhaust pulse frequency caused by a change in speed of the internal combustion engine. Therefore, it is possible to suppress resonance of the valve body in a wide range of speeds. Thus, durability of the valve body and the valve seat in contact with the valve body can be improved.

In the above-described valve, the exhaust passage may be joined to one exhaust passage by an exhaust path in accordance with the number of cylinders of the internal combustion engine. The valve seat may be provided in a middle of the one joined exhaust passage. The urging unit may be a spring member configured to urge the valve body in a direction of closing the valve, and be set to have a spring constant suppressing vibration of the valve body caused by vibration of exhaust pulse frequency determined by a predetermined speed of the internal combustion engine and the number of cylinders of the internal combustion engine when the valve is closed and the valve body is pressed against the valve seat. When the speed of the internal combustion engine is lower than the predetermined speed, the movement unit may move the valve body in a direction of suppressing vibration of the valve body caused by vibration of exhaust pulse frequency applied to the valve body.

According to the above-described valve, the exhaust passage is joined to one exhaust passage by the exhaust path in accordance with the number of cylinders of the internal combustion engine. The valve seat is provided in the one joined exhaust passage. The urging unit is configured by the spring member configured to urge the valve body in a direction of closing the valve, and at the same time the spring constant of the urging unit is set so as to suppress vibration of the valve body caused by vibration of exhaust pulse frequency determined by a predetermined speed and the number of cylinders of the internal combustion engine when the valve is closed and the valve body is pressed against the valve seat. When the speed of the internal combustion engine is lower than the predetermined speed, the movement unit moves the valve body in a direction of suppressing vibration of the valve body caused by vibration of exhaust pulse frequency applied to the valve body. Therefore, it is possible to suppress further resonance of the valve body. Thus, durability of the valve body can be improved.

Advantageous Effects of Invention

In accordance with a valve of the present invention, it may be possible to reliably close a flow passage by the valve and simultaneously improve durability of a valve body and a valve seat.

BRIEF DESCRIPTION OF DRAWINGS

FIG. 4A is a graph illustrating a comparison in a relationship between an engine speed and a valve body in the case of a four-cylinder and four-cycle engine.

FIG. 4B is a graph illustrating a comparison in a relationship between an engine speed and a valve body in the case of a two-cylinder and four-cycle engine.

DESCRIPTION OF EMBODIMENTS

A valve according to a first embodiment of the present invention will be described with reference to the drawings. In addition, the embodiment illustrated below is a specific preferable example of the valve according to the present invention. Although various preferable technical configurations may be added as limitations herein, the scope of the present invention should not be limited to the embodiments set forth herein unless an expression specifying the present invention is particularly described. Constituent elements in the embodiments set forth herein may be appropriately substituted with constituent elements in the related art or the like. In addition, various variations such as combinations of the embodiments set forth herein with constituent elements in the related art are possible. Therefore, the scope of the present invention defined in the appended claims should not be limited to the description of the embodiments set forth herein.

Figure 1:
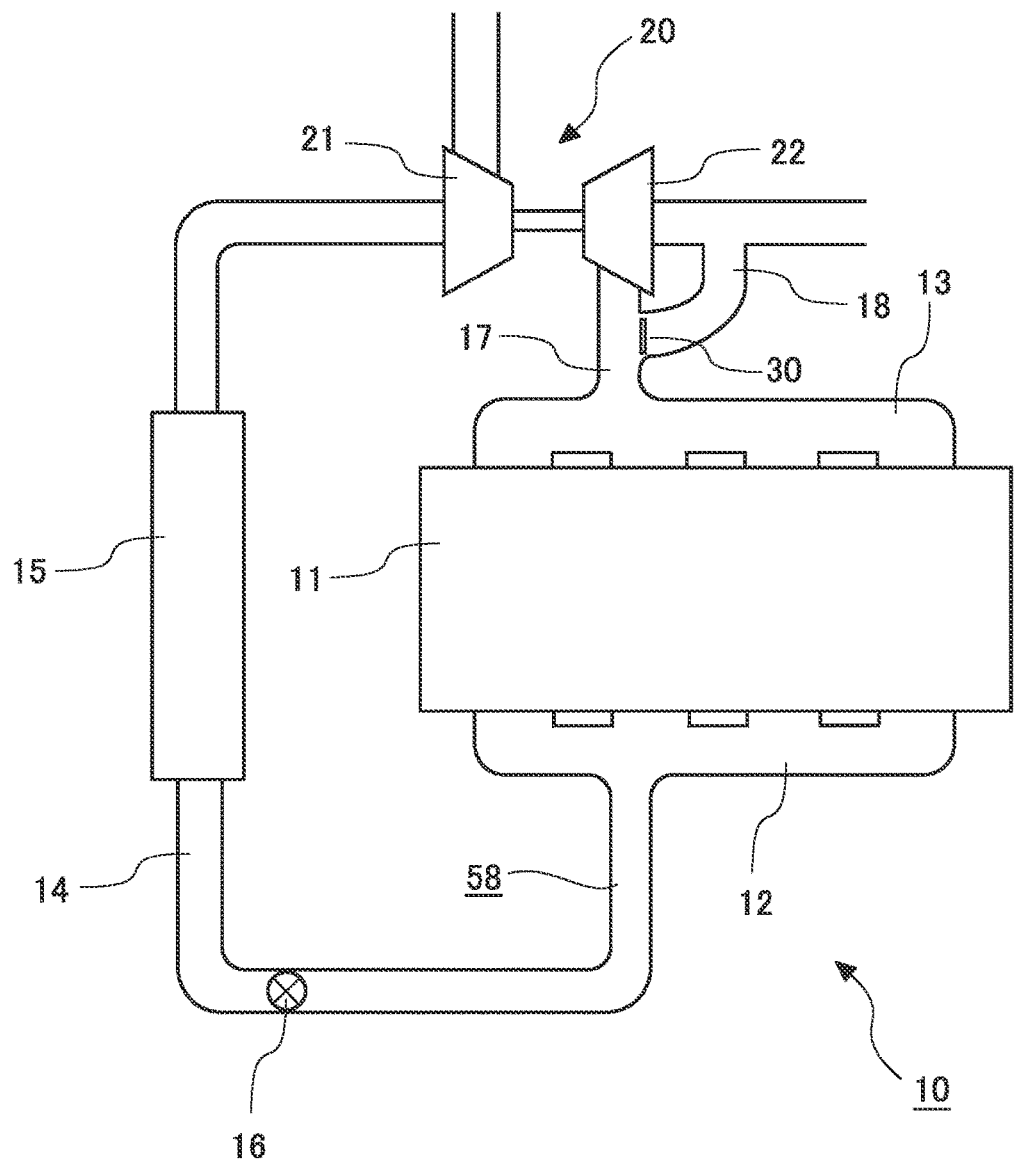
FIG. 1 is a diagram explaining a supply and exhaust system of an engine equipped with a valve according to a first embodiment of the present invention.
Figure 2A:
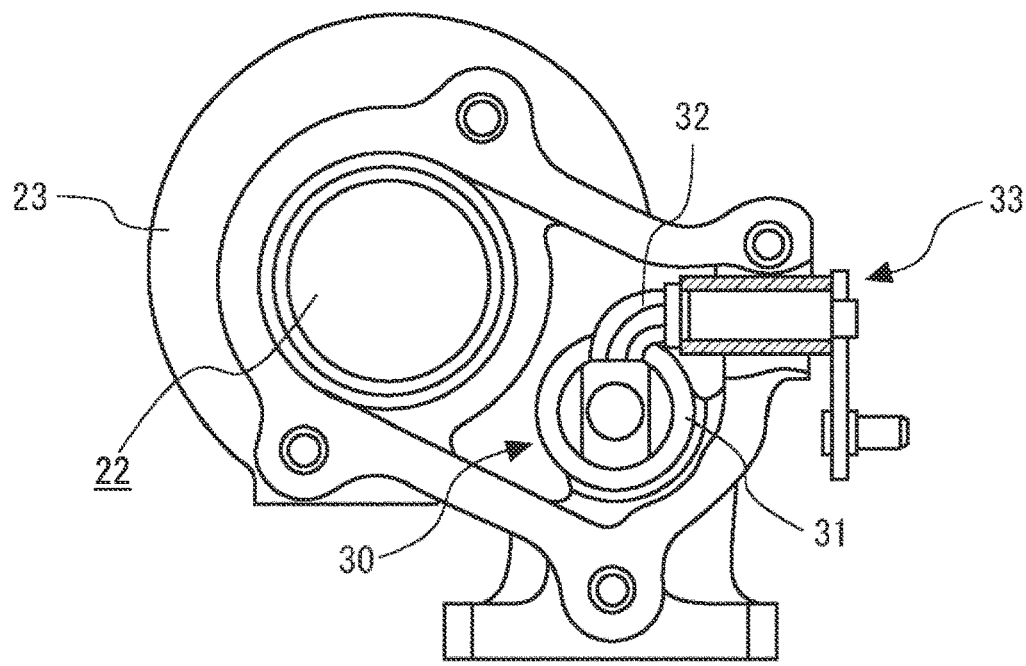
FIG. 2A is a front view illustrating principal parts of an exhaust turbine of an exhaust turbocharger equipped with the valve according to the first embodiment of the present invention.
Figure 2B:
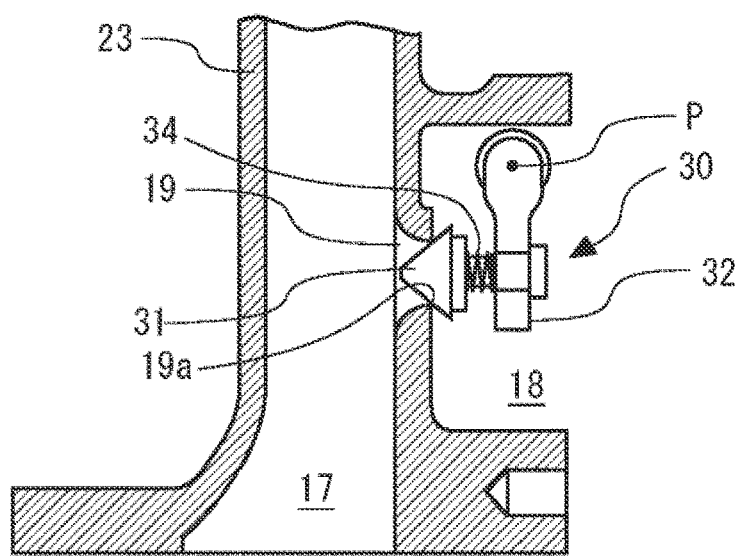
FIG. 2B is a cross-sectional view illustrating the principal parts of the exhaust turbine of the exhaust turbocharger equipped with the valve according to the first embodiment of the present invention.
Figure 3A:
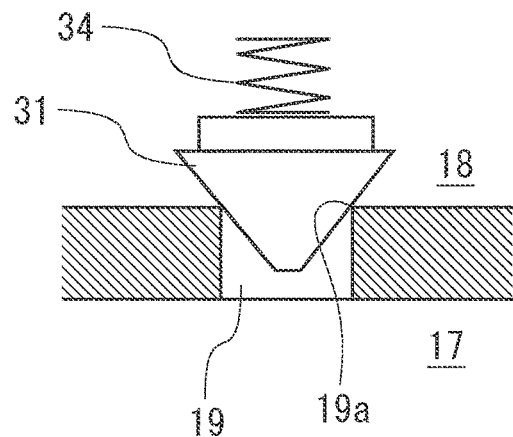
FIG. 3A is a view explaining principal parts of an example of a spring member which is usable as an urging unit of the valve according to the first embodiment of the present invention.
Figure 3B:
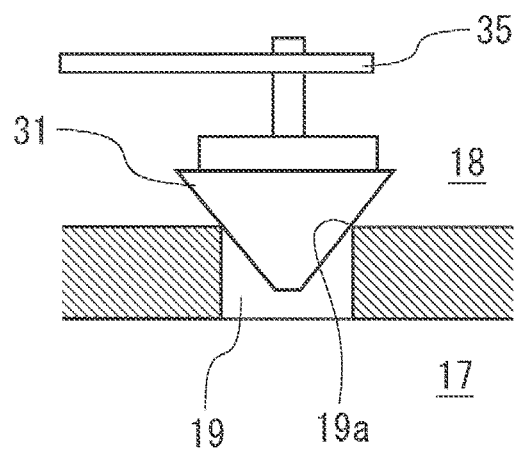
FIG. 3B is a view explaining principal parts of another example of the spring member which is usable as the urging unit of the valve according to the first embodiment of the present invention.
Figure 3C:
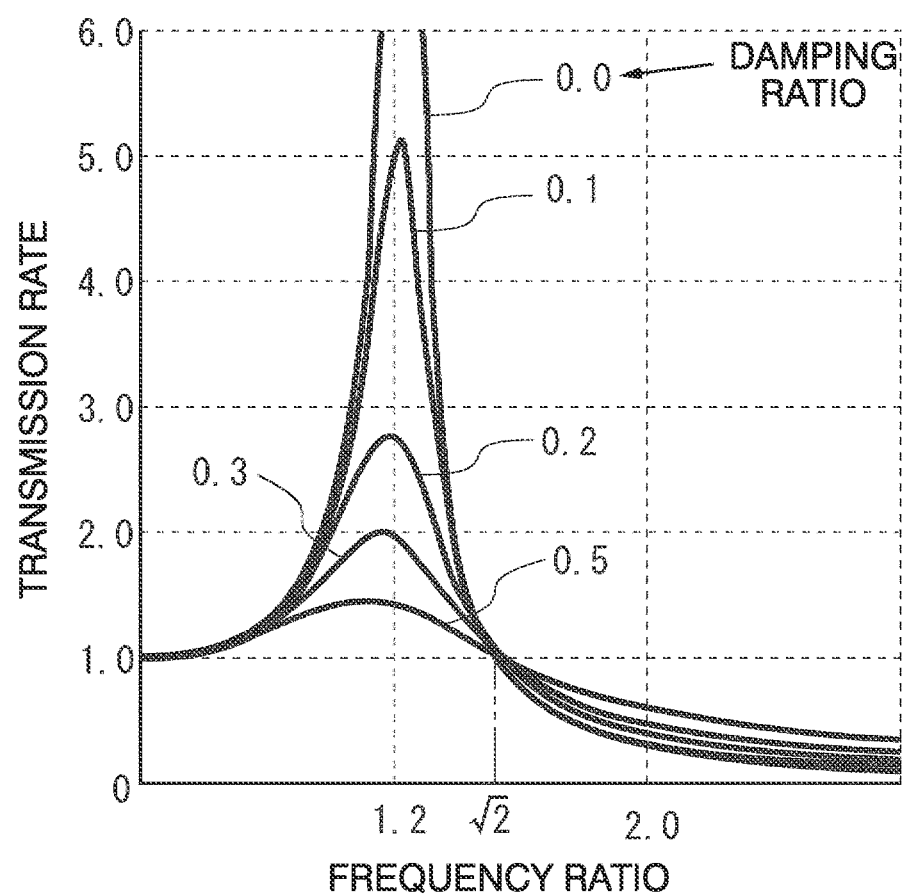
FIG. 3C is a graph illustrating a relationship between exhaust pulse frequency and natural frequency of a valve body.
Figure 5A:
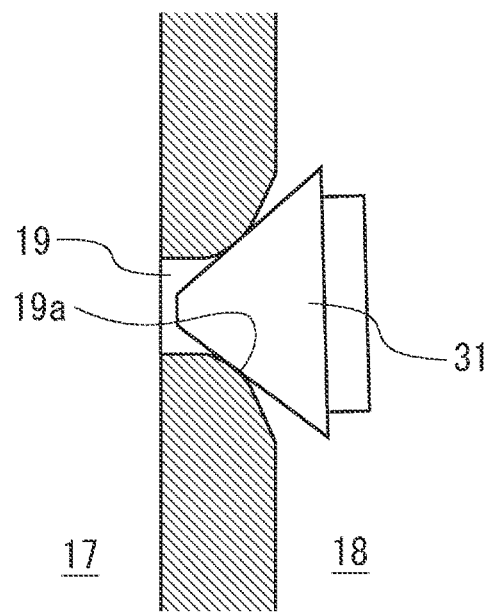
FIG. 5A is a cross-sectional view of principal parts of a modified example of a valve seat of the valve according to the first embodiment of the present invention.
Figure 5B:
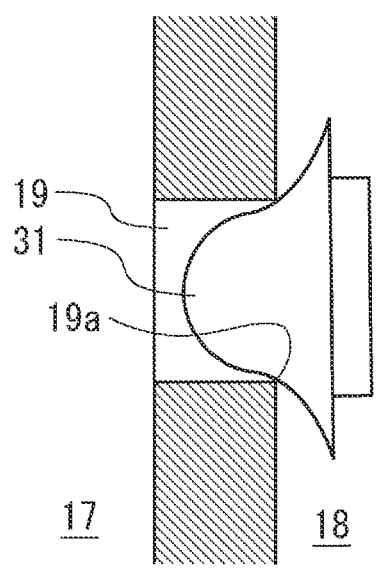
FIG. 5B is a cross-sectional view of principal parts of a modified example of the valve body of the valve according to the first embodiment of the present invention.
Figure 6A:
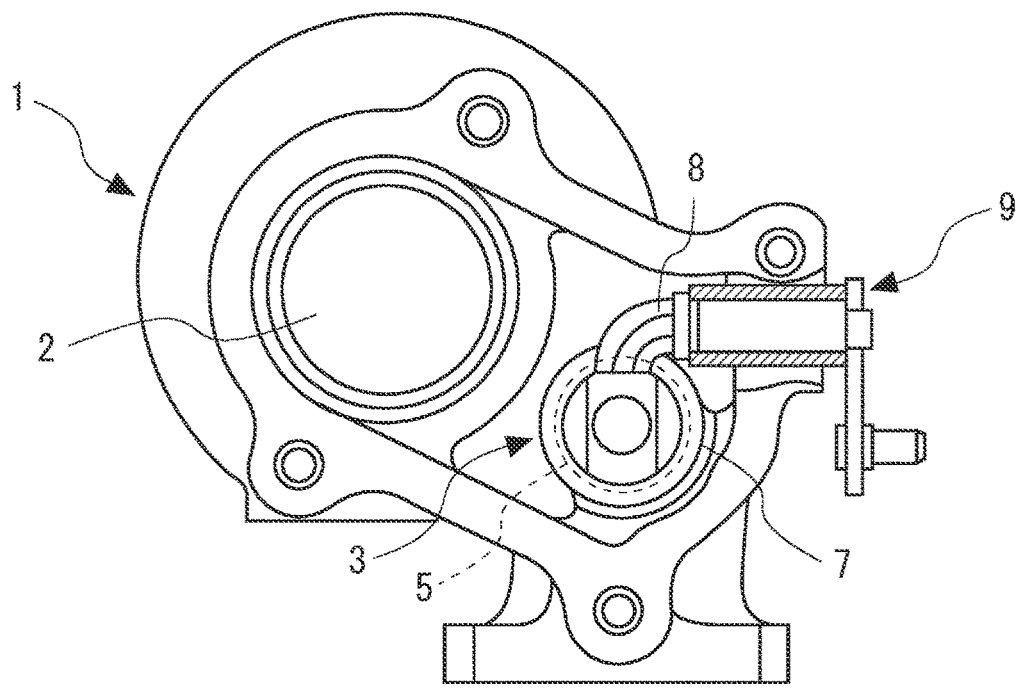
FIG. 6A is a front view illustrating principal parts of an exhaust turbine of an exhaust turbocharger equipped with a conventional valve.
Figure 6B:
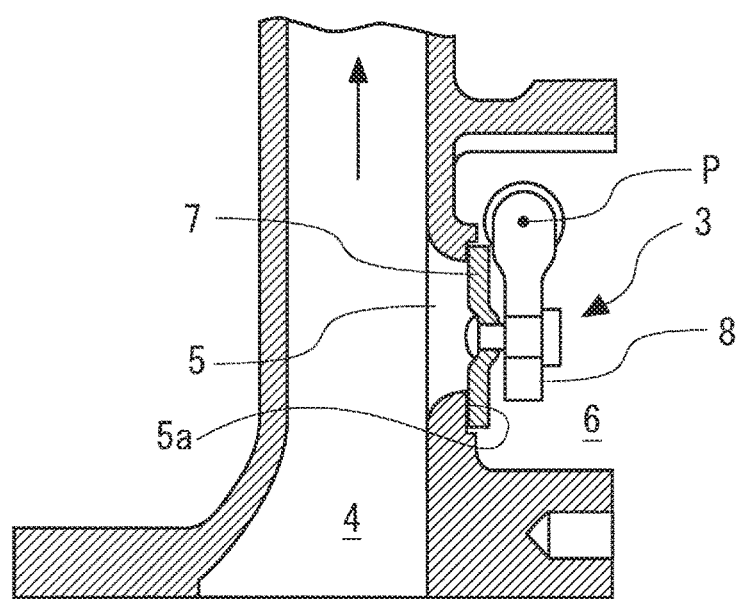
FIG. 6B is a cross-sectional view illustrating the principal parts of the exhaust turbine of the exhaust turbocharger equipped with the conventional valve.

FIG. 1 is a diagram explaining a supply and exhaust system of an engine equipped with a valve according to a first embodiment of the present invention. FIGS. 2A and 2B show an example of an exhaust turbine of an exhaust turbocharger equipped with the valve according to the embodiment. FIG. 2A is a front view illustrating principal parts of the exhaust turbine, and FIG. 2B is a cross-sectional view illustrating the principal parts. FIGS. 3A, 3B, and 3C show a relationship between an urging unit and a spring constant of the valve. FIG. 3A is a view explaining principal parts of an example of a spring member. FIG. 3B is a view explaining principal parts of another example of the spring member. FIG. 3C is a graph illustrating a relationship between exhaust pulse frequency and natural frequency of a valve body. FIGS. 4A and 4B show a comparison in relationships between an engine speed, a valve body, and the number of cylinders. FIG. 4A is a comparison graph in the case of a four-cylinder and four-cycle engine. FIG. 4B is a comparison graph in the case of a two-cylinder and four-cycle engine. FIGS. 5A and 5B show a modified example of the embodiment. FIG. 5A is a cross-sectional view of principal parts of a modified example of a valve seat. FIG. 5B is a cross-sectional view of principal parts of a modified example of the valve body.

In FIG. 1, the block 11 of an engine 10 is connected with a supply manifold 12 and an exhaust manifold 13. The supply manifold 12 distributes intake air to each cylinder. The exhaust manifold 13 receives exhaust from each cylinder.

The supply manifold 12 is provided with a compressor 21 of a turbocharger 20. The compressor 21 is driven by an exhaust turbine 22 connected thereto on the same axis. An intercooler 15 is provided on an intake path 14 between the supply manifold 12 and the compressor 21. The intercooler 15 performs heat exchange between intake air, which is compressed by the compressor 21 and has an increased temperature, and the atmosphere. A slot valve 16 is provided downstream from the intercooler 15 of the intake path 14. The slot valve 16 adjusts a flow rate of intake air flowing in the intake path 14 so as to adjust output power of the engine 10.

The exhaust turbine 22 is provided downstream from an exhaust passage 17 in which exhaust merged by the exhaust manifold 13 flows. The exhaust turbine 22 is driven by the exhaust which is discharged from the engine 10 to be supplied from the exhaust passage 17. The exhaust passage 17 is provided with a bypass passage 18. The bypass passage 18 bypasses the exhaust turbine 22 by directly connecting an exhaust inlet side and an exhaust outlet side of the exhaust turbine 22. The bypass passage 18 is opened and closed relative to the exhaust passage 17 by a waste gate valve 30.

According to such a configuration, the exhaust from the basic engine 11 is collected by the exhaust manifold 13 and is transferred to the exhaust turbine 22 of the turbocharger 20 through the exhaust passage 17. The exhaust is converted into kinetic (rotational) energy by the exhaust turbine 22.

The compressor 21 is rotated by driving of the exhaust turbine 22 and pressurizes supply air. The pressurized supply air is supplied from the supply manifold 12 to the basic engine 11 via the intake path 14, the intercooler 15, and the supply pipe 58.

Here, the bypass passage 18 communicates with the exhaust passage 17 when the waste gate valve 30 is opened. In this case, the exhaust from the basic engine 11 bypasses the exhaust turbine 22 by flowing into the bypass passage 18. Thus, overspeed of the turbocharger 20 is prevented.

For example, opening and closing of the waste gate valve 30 are controlled by outlet pressure of the compressor 21. That is, when the detected outlet pressure becomes a preset threshold or more, the waste gate valve 30 is opened. In addition, when the detected outlet pressure becomes a preset threshold or less, the waste gate valve 30 is closed. The exhaust bypasses the exhaust turbine 22 and is discharged by the above control, so that the overspeed of the turbocharger 20 can be prevented. In addition, various measured values, which vary according to general rotation of the turbocharger, such as the speed of the turbocharger 20, the speed of the engine 10, and the pressure and flow rate of the exhaust, may be used to control the opening and closing of the waste gate valve 30.

As shown in FIGS. 2A and 2B, the exhaust turbine 22 is provided in a turbine casing 23. The turbine casing 23 forms a portion of the exhaust passage 17. A valve seat 19a, which has an opening 19 communicating with the bypass passage 18, is provided upstream from the turbine casing 23.

The waste gate valve 30 includes a valve body 31, an arm 32, and a drive portion 33. The valve body 31 opens and closes the opening 19. The valve body 31 is pressed against a peripheral portion of the opening 19 of the valve seat 19a when the waste gate valve 30 is closed. The arm 32 supports the valve body 31. The drive portion 33 rotates the arm 32 to move the valve body 31 in a direction of intersecting the opening 19. The valve body 31 is supported to be movable relative to the arm 32 in a tangential direction of rotation thereof. Moreover, the valve body 31 is urged toward the valve seat 19a relative to the arm 32 by a compression coil spring 34.

The valve body 31 is a valve body having a substantially conical shape formed so as to taper toward the exhaust passage 17. An outer circumference of the valve body 31 comes into contact (ideally, linear contact) with an inner circumference of the opening 19, thereby closing the opening 19. The valve body 31 is spaced apart from the opening 19, thereby opening the opening 19.

A specific configuration of the drive portion 33 will be omitted. As the drive portion 33, a known rotary actuator which is rotatably operated by magnetism, pneumatic pressure, etc. is used. The drive portion 33 rotates the arm 32 about a support point P. The drive portion 33 functions as a movement unit by cooperating with the arm 32. Specifically, when the speed of the basic engine is equal to or less than a predetermined speed (for example, 3000 rpm), the drive portion 33 rotates the arm 32 to close the valve body 31. In addition, when the speed of the basic engine is equal to or greater than a predetermined speed, the drive portion 33 rotates the arm 32 to open the valve body 31.

As shown in FIG. 3A, the coil spring 34 causes the valve body 31 to be pressed against the valve seat 19a by being compressed in a state in which the valve body 31 is in a closed state and comes into contact with the valve seat 19a. In addition, as an urging unit, the arm 32 itself may also be used as a leaf spring 35 such that the valve body 31 is urged toward the exhaust passage 17 from the bypass passage 18, as shown in FIG. 3B. Alternatively, a leaf spring 35 is provided at a tip of the arm 32 and thus the valve body 31 may also be supported by the leaf spring 35.

In this case, spring constants of the coil spring 34 and the leaf spring 35 are set as spring constants which suppress vibration of the valve body 31 by vibration of exhaust pulse frequency. The exhaust pulse frequency is determined by a predetermined speed and the number of cylinders (four cylinders in FIG. 1) of the basic engine 11 when the waste gate valve 30 is closed and the valve body 31 is pressed against the valve seat 19a. Specifically, as shown in FIG. 3C, when the natural frequency of the valve body 31 is lower than the exhaust pulse frequency (a range equal to or greater than $\sqrt{2}$ in FIG. 3C), vibration of the valve body 31 can be suppressed.

In more detail, the above configuration is as follows. As shown in FIG. 4A, when the basic engine 11 is a four-cylinder and four-cycle engine, the exhaust pulse frequency when the engine speed is 1000 [rpm] is $$1000 \text{ [rpm]}/60 \times 4 \text{ [cylinders]}/2 = 33 \text{ [Hz]}.$$

In addition, since the explosion of four cycles occurs at a rate of once every two times, it is divided by 2. The natural frequency of the valve body 31 when the engine speed (1000 [rpm]) or more is assumed as a common speed is preferably equal to or less than $$33 \text{ [Hz]}/\sqrt{2} = 23 \text{ [Hz]}.$$

Thus, it is possible to sufficiently lower a valve eigenvalue, compared to the exhaust pulse frequency in a speed region of the basic engine 11 when it is set to the common speed region or the valve-opened state. Therefore, it is possible to suppress natural vibration caused by the exhaust pulse frequency of the valve body 31.

Similarly, as shown in FIG. 4B, when the basic engine 11 is a two-cylinder and four-cycle engine, the exhaust pulse frequency when the engine speed is 1000 [rpm] is 1000 [rpm]/60/min×2 [cylinders]/2=17 [Hz].

The natural frequency of the valve body 31 when the engine speed (1000 [rpm]) or more is assumed as a common speed is preferably equal to or less than 17 [Hz]/√2=12 [Hz].

In addition, when the leaf spring 35 shown in FIG. 3B is used, the valve body 31 performs a circular arc motion by bending of the leaf spring 35. Therefore, there is a possibility of the valve body 31 becoming inclined relative to the valve seat 19a.

Thus, as shown in FIG. 5A, the valve seat 19a may also have a tapered cross-sectional shape in which a peripheral portion (corner portion) of the valve seat 19a expands toward the bypass passage 18. In addition, as shown in FIG. 5B, the valve body 31 may also have a substantially hemispherical shape formed so as to taper toward the exhaust passage 17.

The basic engine 11 rotates at 0 to 10000 and several thousand [rpm]. When the speed of the valve body 31 is equal to or less than a predetermined speed (for example, 3000 [rpm]), the valve body 31 closes the opening 19. Accordingly, the valve body 31 is subjected to exhaust vibration in a wide range of 0 to a predetermined speed. Particularly, the vibration by exhaust increases as the speed of the valve body decreases.

Accordingly, the natural frequency of the valve body 31 is changed so as to correspond to the engine speed using the drive portion 33 for driving the valve body 31. Thereby, it is possible to more reliably suppress resonance of the valve caused by the vibration of the exhaust pulse frequency.

For example, in a valve-closed state in which the opening 19 is closed by the valve body 31, the basic engine 11 is also operated in a low speed region. In this case, when the natural frequency of the valve body 31 is small (the spring constant is small), the valve body 31 may not cope with static pressure of exhaust. Therefore, a method such as increasing the spring constant using an electromagnetic spring or operating the actuator of the drive portion 33 to further urge the valve body 31 in a direction of closing the valve may make it difficult to generate resonance while the valve body 31 secures the valve-closed state. In this case, for example, the spring constant and an urging force are set in a plurality of stages of a predetermined speed or less (for example, by the 1000 [rpm] or by the 500 [rpm]), and the set values are stored in a storage medium (not shown) as a table. It is possible to monitor the speed of the basic engine 11 using a known sensor and to control the drive portion 33 such that the spring constant and the urging force stored in the storage medium according to the stages of the speed are obtained.

Meanwhile, in a valve-opened state in which the opening 19 is opened by the valve body 31, the basic engine 11 is operated in a high-speed region. In this case, there is a possibility of resonance when the natural frequency of the valve body 31 is close to the exhaust pulse frequency. Therefore, it is possible to suppress vibration by sufficiently lowering the spring constant (by lowering the natural frequency) of the valve body 31.

Thus, according to the waste gate valve 30 of the embodiment, the valve body 31 having a conical surface or spherical surface comes into contact with the valve seat 19a to close the opening 19. The drive portion 33 moves the valve body 31 in a direction of intersecting the opening 19. The coil spring 34 or the leaf spring 35 urges the valve body 31 in a movement direction thereof. The urging force (specifically, spring constant) of the coil spring 34 or the leaf spring 35 is set such that the valve body 31 is controlled in a direction of suppressing the vibration thereof caused by the vibration of the exhaust pulse frequency determined by the speed and number of cylinders of the basic engine 11. According to such a configuration, the valve body 31 can be suppressed from resonating by the vibration of the exhaust pulse frequency when the basic engine 11 is driven. Thus, durability of the valve body 31 can be improved.

By adjusting the urging force of the coil spring 34 or the leaf spring 35 according to exhaust pulse frequency caused by a change in speed of the basic engine 11, natural frequency of the valve body 31 may also be changed according to vibration frequency of the valve body 31.

Furthermore, the exhaust passage 17 may also be joined to one exhaust passage 17 by exhaust paths according to the number of cylinders of the basic engine 11. The valve seat 19a may also be provided in the middle of the one joined exhaust passage 17. The coil spring 34 or the leaf spring 35 may also be configured as a spring member urging the valve body 31 in a direction of closing, and at the same time the spring constant of the coil spring 34 or the leaf spring 35 may be set so as to suppress vibration of the valve body 31 caused by vibration of exhaust pulse frequency determined by a predetermined speed and the number of cylinders of the basic engine 11 when the waste gate valve 30 is closed and the valve body 31 is pressed against the valve seat 19a. When the speed of the basic engine 11 is lower than a predetermined speed, the drive portion 33 may also move the valve body 31 in a direction of suppressing vibration of the valve body 31 caused by vibration of exhaust pulse frequency applied to the valve body 31. According to the above configurations, further resonance of the valve body 31 can be suppressed. Thus, durability of the valve body 31 can be improved.

The valve according to the embodiment is disclosed as being applied to the waste gate valve 30. However, the valve may of course be applied to an exhaust system of an overall internal combustion engine. In addition, in the above embodiment, the case of the four-cylinder and four-cycle engine or the two-cylinder and four-cycle engine has been described. However, the present invention is not limited thereto. Particularly, the present invention can also cope with a reduction of the number of cylinders (two cylinders) due to recent downsizing, a rotary engine, and temporary stop control of the number of driving cylinders by idling stop.

INDUSTRIAL APPLICABILITY

In accordance with the above-described valve, it is possible to reliably close a flow passage by the valve and simultaneously improve durability of the valve body and the valve seat.

REFERENCE SIGNS LIST 10 engine
11 basic engine (internal combustion engine)
17 exhaust passage
18 bypass passage
19 opening
19a valve seat 30 waste gate valve (valve)
31 valve body
32 arm (movement unit)
33 drive portion (movement unit)
34 coil spring (urging unit)
35 leaf spring (urging unit)

The invention claimed is:

1. A valve provided in an exhaust passage of an internal combustion engine to release exhaust, the valve comprising:
a valve seat having an opening opened to the exhaust passage;
a valve body having a surface configured to close the opening by coming into contact with the valve seat;
an arm supporting the valve body;
an actuator configured to move the valve body with the arm in a direction of intersecting the opening; and
a spring configured to urge the valve body in the direction of intersecting the opening to close the valve,
wherein the actuator is configured to control the urging force of the spring in accordance with exhaust pulse frequency relating to the speed of the internal combustion engine,
the spring is set to have a spring constant suppressing vibration of the valve body caused by vibration of exhaust pulse frequency determined by a predetermined speed of the internal combustion engine and the number of cylinders of the internal combustion engine when the valve is closed and the valve body is pressed against the valve seat,
further comprising a storage medium storing set values of urging force in a plurality of stages relating to a predetermined engine speed or less, and a sensor monitoring the speed of the internal combustion engine,
wherein when the valve is closed and when the speed of the internal combustion engine is lower than the predetermined speed, the actuator is operated to further urge the valve body toward the valve seat in accordance with the urging force stored in the storage medium corresponding to the speed of the internal combustion engine whereby the actuator moves the valve body in a direction of suppressing vibration of the valve body caused by vibration of exhaust pulse frequency applied to the valve body.

2. The valve according to claim 1, wherein:
the exhaust passage is joined to one exhaust passage by an exhaust path in accordance with the number of cylinders of the internal combustion engine; and
the valve seat is provided in the one joined exhaust passage.

3. A valve provided in an exhaust passage of an internal combustion engine to release exhaust, the valve comprising:
a valve seat having an opening opened to the exhaust passage;
a valve body having a surface configured to close the opening by coming into contact with the valve seat;
an arm supporting the valve body;
an actuator configured to move the valve body with the arm in a direction of intersecting the opening; and
an electromagnetic spring configured to urge the valve body in the direction of intersecting the opening to close the valve,
wherein
the actuator is configured to control the urging force of the electromagnetic spring in accordance with exhaust pulse frequency relating to the speed of the internal combustion engine,
the electromagnetic spring is set to have a spring constant suppressing vibration of the valve body caused by vibration of exhaust pulse frequency determined by a predetermined speed of the internal combustion engine and the number of cylinders of the internal combustion engine when the valve is closed and the valve body is pressed against the valve seat,
further comprising a storage medium storing set values of the spring constant in a plurality of stages relating to a predetermined engine speed or less, and a sensor monitoring the speed of the internal combustion engine,
wherein when the valve is closed and when the speed of the internal combustion engine is lower than the predetermined speed, the spring constant of the electromagnetic spring is increased in accordance with the spring constant stored in the storage medium corresponding to the speed of the internal combustion engine whereby vibration of the valve body caused by vibration of exhaust pulse frequency applied to the valve body is suppressed.

4. The valve according to claim 3, wherein:
the exhaust passage is joined to one exhaust passage by an exhaust path in accordance with the number of cylinders of the internal combustion engine; and
the valve seat is provided in the one joined exhaust passage.

5. The valve according to claim 1, wherein the surface of said valve body is conical.

6. The valve according to claim 1, wherein the surface of said valve body is spherical.

7. The valve of claim 1, wherein said spring is a coil spring.

8. The valve of claim 1, wherein said spring is a leaf spring.

9. The valve according to claim 3, wherein the surface of said valve body is conical.

10. The valve according to claim 3, wherein the surface of said valve body is spherical.

* * * * *